US012732817B2

(12) United States Patent
Liang et al.

(10) Patent No.: US 12,732,817 B2
(45) Date of Patent: Sep. 8, 2026

(54) UE DISCOVERY MESSAGE PROTECTION METHOD AND APPARATUS, COMMUNICATION DEVICE, AND STORAGE MEDIUM

(71) Applicant: Beijing Xiaomi Mobile Software Co., Ltd., Beijing (CN)

(72) Inventors: Haoran Liang, Beijing (CN); Wei Lu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/833,206

(22) PCT Filed: Jan. 29, 2022

(86) PCT No.: PCT/CN2022/075131

§ 371 (c)(1),
(2) Date: Jul. 25, 2024

(87) PCT Pub. No.: WO2023/142095

PCT Pub. Date: Aug. 3, 2023

(65) Prior Publication Data

US 2025/0113191 A1 Apr. 3, 2025

(51) Int. Cl.
*H04W 12/106* (2021.01)
*H04W 12/037* (2021.01)

(52) U.S. Cl.
CPC ....... *H04W 12/106* (2021.01); *H04W 12/037* (2021.01)

(58) Field of Classification Search
CPC .......................... H04W 12/106; H04W 12/037
USPC .......................................................... 713/160
See application file for complete search history.

(56) References Cited

U.S. PATENT DOCUMENTS

2015/0271675 A1 9/2015 Cheng et al.
2016/0302137 A1* 10/2016 Escott ................ H04W 12/106
2017/0164189 A1 6/2017 Zhong
2017/0374549 A1 12/2017 Anil et al.
(Continued)

FOREIGN PATENT DOCUMENTS

CN 106105140 A 11/2016
CN 106576241 A 4/2017
(Continued)

OTHER PUBLICATIONS

Abd-Elrahman et al., "Fast group discovery and non-repudiation in D2D communications using IBE," 2015 International Wireless Communications and Mobile Computing Conference (IWCMC), Dubrovnik, Croatia, 2015, pp. 616-621, doi: 10.1109/IWCMC.2015.7289154. (Year: 2015).*
(Continued)

*Primary Examiner* — Peter C Shaw
(74) *Attorney, Agent, or Firm* — Volpe Koenig

(57) ABSTRACT

A UE discovery message protection method, includes: when a first UE is located outside network coverage, monitoring a first announcement message, where the first announcement message includes: a discovery message, which is encrypted on the basis of a discovery key, and an LTK ID, which indicates a LTK; and determining the discovery key on the basis of the LTK corresponding to the LTK ID, where the LTK is received when the first UE is within the network coverage.

8 Claims, 10 Drawing Sheets

(56) References Cited

U.S. PATENT DOCUMENTS

| | | | | |
|---|---|---|---|---|
| 2018/0069846 | A1* | 3/2018 | Park | H04W 12/041 |
| 2018/0234827 | A1 | 8/2018 | Stojanovski et al. | |
| 2020/0280854 | A1* | 9/2020 | Kunz | H04W 12/0431 |
| 2021/0058252 | A1 | 2/2021 | Jung et al. | |
| 2021/0400759 | A1* | 12/2021 | Kuo | H04W 76/23 |
| 2023/0048777 | A1* | 2/2023 | Kodaypak | H04W 36/00222 |
| 2023/0147562 | A1* | 5/2023 | Kneckt | H04W 12/06 380/270 |

FOREIGN PATENT DOCUMENTS

| | | | | |
|---|---|---|---|---|
| CN | 107113594 | A | 8/2017 | |
| CN | 107852418 | A | 3/2018 | |
| WO | 2013118096 | A1 | 8/2013 | |
| WO | WO-2016114640 | A1 * | 7/2016 | H04W 12/08 |
| WO | WO-2022070170 | A1 * | 4/2022 | H04W 76/14 |
| WO | WO-2022148622 | A1 * | 7/2022 | H04W 12/033 |
| WO | WO-2024028393 | A1 * | 2/2024 | H04L 5/0044 |

OTHER PUBLICATIONS

Sartori et al., "Design of a D2D Overlay for Next Generation LTE," 2014 IEEE 80th Vehicular Technology Conference (VTC2014—Fall), Vancouver, BC, Canada, 2014, pp. 1-5, doi: 10.1109/VTCFall.2014.6965931. (Year: 2014).*

Tsolkas et al., "A device discovery scheme for proximity services in LTE networks," 2014 IEEE Symposium on Computers and Communications (ISCC), Funchal, Portugal, 2014, pp. 1-6, doi: 10.1109/ISCC.2014.6912514. (Year: 2014).*

Prasad et al., "Energy-Efficient D2D Discovery for Proximity Services in 3GPP LTE-Advanced Networks: ProSe Discovery Mechanisms," in IEEE Vehicular Technology Magazine, vol. 9, No. 4, pp. 40-50, Dec. 2014, doi: 10.1109/MVT.2014.2360652. (Year: 2014).*

3GPP."Study on architecture enhancements to support Proximity Services (ProSe) (Release 12)",3GPP TR 23.703 VO.4.1(Jun. 13, 2013).

* cited by examiner

Second UE

Network device

S81: Send a first announcement message in response to determining that the second UE is within a network coverage, where the first announcement message includes: a discovery message encrypted based on a discovery key, and an LTK ID indicating an LTK

FIG. 9

UE DISCOVERY MESSAGE PROTECTION METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2022/075131, filed on Jan. 29, 2022, the contents of all of which are incorporated herein by reference in their entireties for all purposes.

BACKGROUND OF THE INVENTION

In a wireless communication system, such as in the fifth-generation mobile communication technology (5G) system, some User Equipment (UE) are within the coverage range of a 5G network, while others are outside the coverage range of the 5G network. Regardless of whether the UE is within the coverage range of the 5G network, ranging services can be supported.

Prior to ranging target UE, observer UE needs to utilize a discovery message for ranging to detect and identify nearby target UE. For a Class B restricted ranging discovery process, the discoverer UE declares a discovery message on the proximity communication (PC5) interface, and the discovery message may contain contents relevant to the desired discovery. The discoverer UE for receiving information can respond using some information relevant to the discovery message sent by the discoverer UE. In the Class B restricted ranging discovery process without a privacy protection mechanism, the discovery message contains the privacy of the UE participating in the ranging process. In 5G network communications, the protection of discovery messages can be facilitated by providing discovery keys with expiration periods to the enabled ranging UE when they are covered by the 5G network.

SUMMARY OF THE INVENTION

The disclosure relates to, but is not limited to the technical field of communication, in particular to a UE discovery message protection method and apparatus, a communication device and a storage medium.

Examples of the disclosure provide a discovery message protection method and apparatus, a communication device and a storage medium.

According to a first aspect of the disclosure, a UE discovery message protection method is provided and executed by first UE, and includes:

- monitoring, in response to determining that the first UE is located outside a network coverage, a first announcement message, where the first announcement message includes: a discovery message encrypted based on a discovery key and an LTK ID used for indicating a long-term key (LTK); and
- determining the discovery key based on the LTK corresponding to the LTK ID, where the LTK is received when the first UE is within the network coverage.

According to a second aspect of the disclosure, a UE discovery message protection method is provided and executed by second UE, and includes:

- sending, in response to determining that the second UE is within a network coverage, a first announcement message, where the first announcement message includes: a discovery message encrypted based on a discovery key and an LTK ID used for indicating a long-term key (LTK).

The LTK ID is used for first UE outside the network coverage to determine the LTK corresponding to the LTK ID, and the LTK is used for the first UE to determine the discovery key.

According to a third aspect of the disclosure, a UE discovery message protection method is provided and executed by a ranging key management function (RKMF), and includes:

- receiving an LTK request carrying an identifier of first UE; and
- sending, to the first UE, LTK and LTK ID determined based on the LTK request, where the LTK and the LTK ID are used for determining, in response to determining that the first UE located outside a network coverage monitors a first announcement message sent by second UE, a discovery key for encrypting a discovery message in the first announcement message based on the LTK ID in the first announcement message.

According to a fourth aspect of the disclosure, a communication device is provided and includes:

- a processor; and
- a memory used for storing a processor executable instruction.

The processor is configured to: when running the executable instruction, implement a UE discovery message protection method of any one of the examples of the disclosure.

According to a fifth aspect of the disclosure, a computer storage medium is provided, and stores a computer executable program. The executable program, when executed by a processor, implements a UE discovery message protection method of any one of the examples of the disclosure.

It needs to be understood that the above general description and the detailed descriptions that follow are examples and explanatory only and do not limit the presently disclosed examples.

BRIEF DESCRIPTION OF DRAWINGS

FIG. 9 is a flow chart of a UE discovery message protection method illustrated according to an example.

DETAILED DESCRIPTION OF THE INVENTION

Examples will be described in detail here, and typical instances thereof are shown in the accompanying drawings. When the following description refers to the accompanying drawings, unless otherwise indicated, the same numbers in different drawings represent the same or similar elements. The embodiments described in the following examples do not represent all embodiments consistent with the disclosure. Rather, they are merely instances of apparatus and methods consistent with some aspects of the disclosure as detailed in the appended claims.

The terms used in the disclosure are merely for the purpose of describing specific embodiments, and are not intended to limit the disclosure. Singular forms of "a", and "said" used in the disclosure and the appended claims are also intended to include plural forms, unless the context clearly indicates other meanings. It should also be understood that the term "and/or" used here refers to and includes any or all possible combinations of one or more associated listed items.

It needs to be understood that although the terms first, second, third, etc. may be used in the examples of the disclosure to describe various information, the information should not be limited to these terms. These terms are merely used to distinguish the same type of information from each other. For example, without departing from the scope of the examples of the disclosure, first information may also be referred to as second information, and similarly, second information may also be referred to as first information. Depending on the context, the word "if" used here may be interpreted as "at the moment of" or "when" or "in response to determining".

Figure 1:
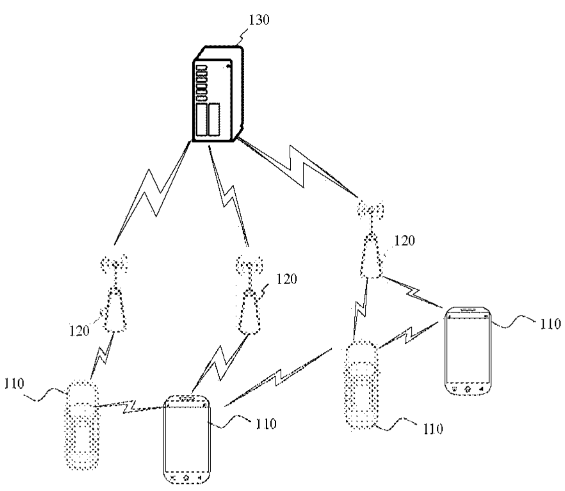
FIG. 1 is a schematic structural diagram of a wireless communication system.

Referring to FIG. 1, which is a schematic structural diagram of a wireless communication system provided by an example of the disclosure. As shown in FIG. 1, the wireless communication system is a communication system based on a cellular mobile communication technology. The wireless communication system may include: a plurality of pieces of user equipment 110 and a plurality of base stations 120.

The user equipment 110 may be devices that provide voice and/or data connectivity for a user. The user equipment 110 may communicate with one or a plurality of core networks via a radio access network (RAN). The user equipment 110 may be Internet of Things terminals, such as sensor devices, mobile phones (or "cellular" phones), and computers with the Internet of Things terminals, for example, may be fixed, portable, pocket-sized, handheld, computer built-in, or vehicle-mounted devices, for example, a station (STA), a subscriber unit, a subscriber station, a mobile station, a mobile, a remote station, an access point, a remote terminal, an access terminal, a user terminal, a user agent, a user device, or user equipment (UE). Or, the user equipment 110 may also be devices of unmanned aerial vehicles. Or, the user equipment 110 may also be vehicle-mounted devices, for example, may be trip computers with a wireless communication function, or a wireless communication device externally connected to a trip computer. Or, the user equipment 110 may also be roadside devices, for example, may be a street lamp, a signal lamp, or another roadside device with a wireless communication function.

The base stations 120 may be network side devices in the wireless communication system. The wireless communication system may be the 4th generation mobile communication (4G) system, also known as a long term evolution (LTE) system; or, the wireless communication system may also be a 5G system, also known as a new radio (NR) system or a 5G NR system. Or, the wireless communication system may also be a next-generation system of the 5G system. An access network in the 5G system may be called a new generation-radio access network (NG-RAN).

The base stations 120 may be evolved base stations (eNBs) adopted in the 4G system. Or, the base stations 120 may also be base stations (gNBs) adopting a central and distributed architecture in the 5G system. When each base station 120 adopts the central and distributed architecture, each base station usually includes a central unit (CU) and at least two distributed units (DUs). Each central unit is provided with protocol stacks of a packet data convergence protocol (PDCP) layer, a radio link control (RLC) protocol layer, and a media access control (MAC) layer; each distributed unit is provided with a physical (PHY) layer protocol stack; and the example of the disclosure does not limit the specific embodiments of the base stations 120.

Wireless connection may be established between each base station 120 and corresponding user equipment 110 through a wireless air interface. In different embodiments, the wireless air interface is a wireless air interface based on the 4th generation mobile communication technology (4G) standard; or, the wireless air interface is a wireless air interface based on the 5th generation mobile communication technology (5G) standard, for example, the wireless air interface is a new air interface; or, the wireless air interface may also be a wireless air interface based on a standard of a next-generation mobile communication network technology of the 5G.

In some examples, end to end (E2E) connection may also be established between the user equipment 110, for example, vehicle to vehicle (V2V) communication, vehicle to infrastructure (V2I) communication, vehicle to pedestrian (V2P) communication, or other scenes in vehicle to everything (V2X) communication.

Here, the abovementioned user equipment may be regarded as terminal devices in the examples below.

In some examples, the above-mentioned wireless communication system may further include a network management device 130.

The plurality of base stations 120 are all connected to the network management device 130. The network management device 130 may be a core network device in the wireless communication system. For example, the network management device 130 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS), etc. The embodiment forms of the network management device 130 are not limited in the examples of the disclosure.

In a wireless communication system, such as in the fifth-generation mobile communication technology (5G) system, some User Equipment (UE) are within the coverage range of a 5G network, while others are outside the coverage range of the 5G network. Regardless of whether the UE is within the coverage range of the 5G network, ranging services can be supported.

Prior to ranging target UE, observer UE needs to utilize a discovery message for ranging to detect and identify nearby target UE. For a Class B restricted ranging discovery process, the discoverer UE declares a discovery message on the proximity communication (PC5) interface, and the discovery message may contain contents relevant to the desired discovery. The discoverer UE for receiving information can respond using some information relevant to the discovery message sent by the discoverer UE. In the Class B restricted ranging discovery process without a privacy protection mechanism, the discovery message contains the privacy of the UE participating in the ranging process. In 5G network communications, the protection of discovery messages can be facilitated by providing discovery keys with expiration periods to the enabled ranging UE when they are covered by the 5G network.

However, in certain 5G network coverage scenarios, when an enabled ranging UE possesses an expired discovery key and is not covered by the 5G network, the discovery message cannot be protected. This situation poses risks of key leakage and degrades user experience.

In order to facilitate the understanding of those skilled in the art, the examples of the disclosure set forth a plurality of embodiments to clearly illustrate the technical solutions of the examples of the disclosure. Of course, those skilled in the art may understand that the examples provided in the disclosure may be performed individually, or in combination with the methods of the other examples in the disclosure, or individually or in combination with some of the methods of other related technologies. The examples of the disclosure do not limit this.

In order to facilitate understanding of the technological solution described in any example disclosed here, first, an explanation of positioning in the related art is provided.

In one example, a ranging service refers to determining at least one of the following pieces of information through a proximity communication link: a distance between two UE, and/or determining a direction from one UE to another UE.

Figure 2:
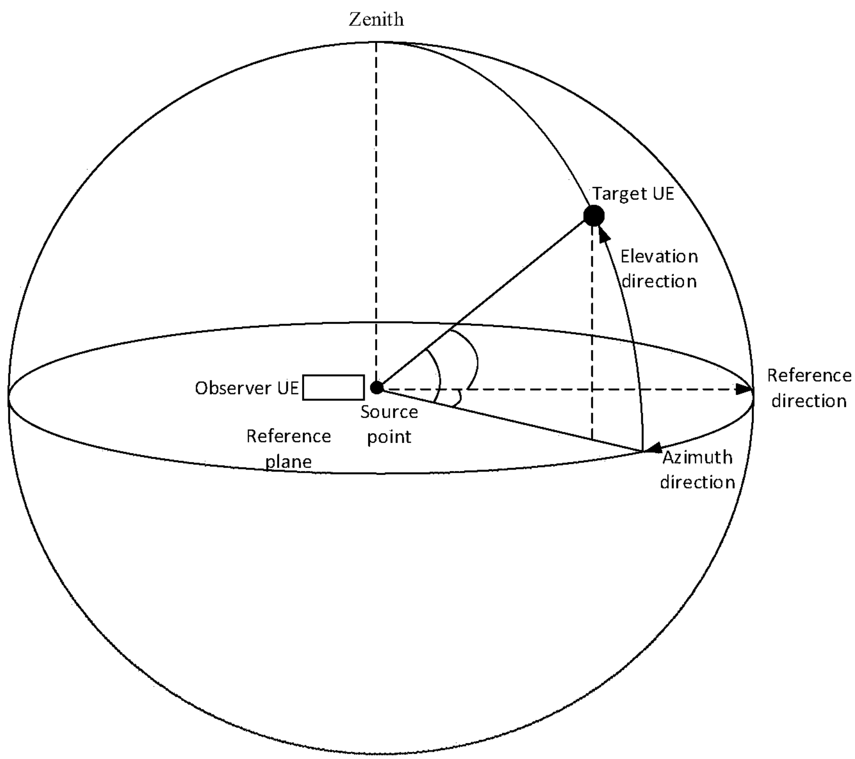
FIG. 2 is a schematic diagram of location determination illustrated according to an example.

In one example, as shown in FIG. 2, the observer UE has a reference plane and a reference direction. The direction from target UE to the observer UE is an included angle formed between a line connecting the observer UE and the target UE and the reference direction. The angle is represented by an azimuth direction and/or elevation direction. The azimuth direction of the target UE is an included angle formed between the reference direction and a linear projection from the observer UE to the target UE on a plane that is perpendicular to the zenith and shares the same reference direction. The elevation direction of the target UE is the angle between the two in the vertical direction (above the horizontal plane).

Figure 3:
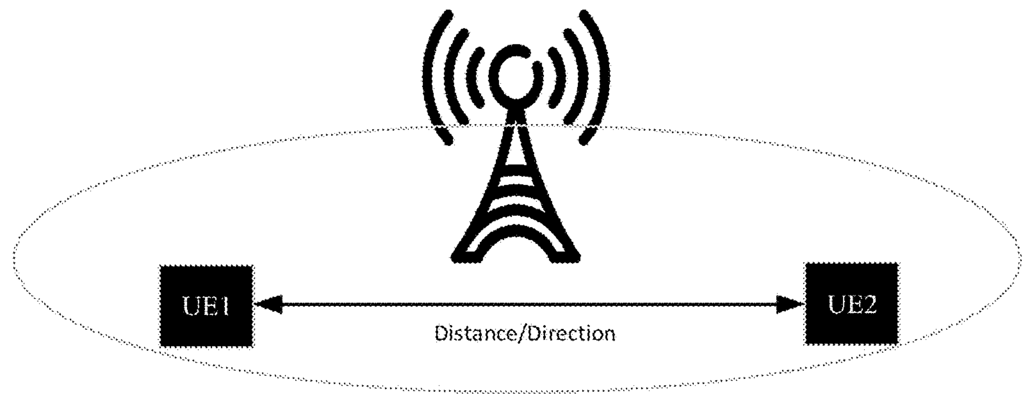
FIG. 3 is a schematic diagram of network coverage illustrated according to an example.
Figure 4:
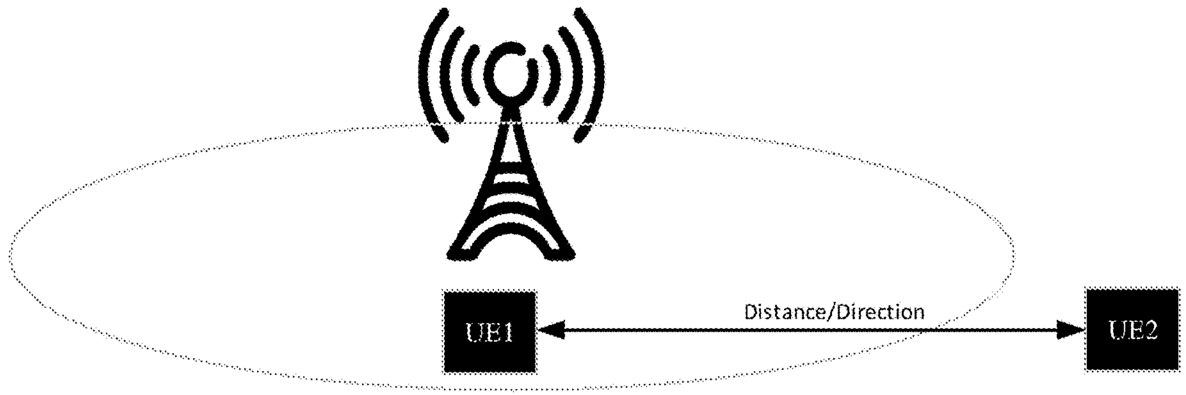
FIG. 4 is a schematic diagram of network coverage illustrated according to an example.
Figure 5:
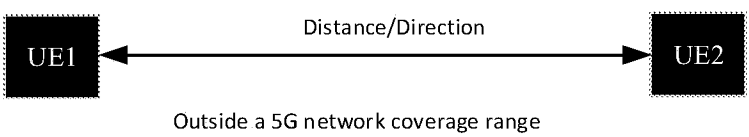
FIG. 5 is a schematic diagram of network coverage illustrated according to an example.

In one example, ranging services can be supported regardless of whether the UE is within the 5G network coverage. As shown in FIG. 3, a diagram of 5G network coverage is provided, where both UE1 and UE2 are within the 5G network coverage. FIG. 4 provides a diagram of partial 5G network coverage, where UE1 is within the 5G network coverage while UE2 is outside. FIG. 5 provides a diagram without 5G network coverage, where neither UE1 nor UE2 is within the 5G network coverage. In one example, when using licensed bands for ranging, it can be fully controlled by an operator.

In all examples of the disclosure, the first UE may be announcing UE, which may be observer UE or discoverer UE. The second UE may be the monitoring UE, which may be the observer UE or the discoverer UE. Alternatively, the first UE may be the monitoring UE, which may be the observer UE or the discoverer UE. The second UE may be the announcing UE, which may be the observer UE or the discoverer UE. In all disclosed examples, when the first UE sends the first announcement message, the second UE monitors the first announcement message. When the second UE sends the second announcement message, the first UE monitors the second announcement message. The first UE and the second UE may interchangeably be the monitoring UE or transmitting UE, and they may also both be the discoverer UE or the observer UE.

Figure 6:
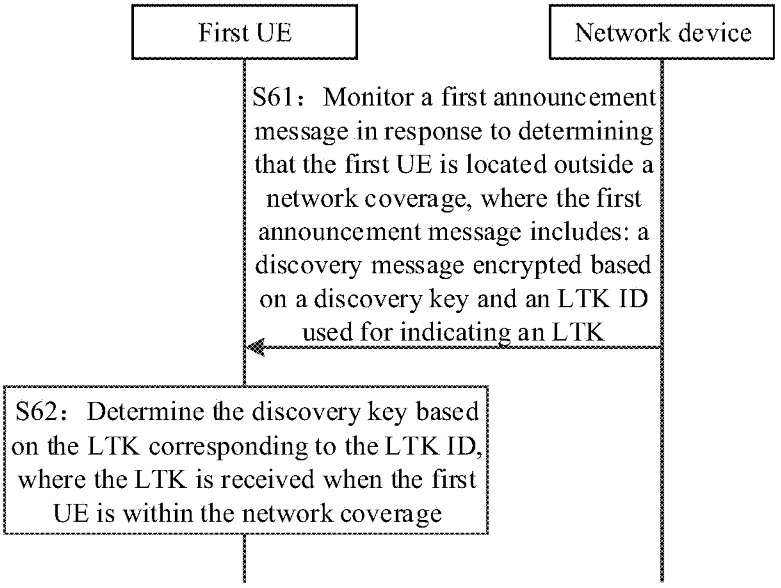
FIG. 6 is a flow chart of a UE discovery message protection method illustrated according to an example.

As shown in FIG. 6, an example of the disclosure provides a UE discovery message protection method, executed by first UE and including:

Step S61: a first announcement message is monitored in response to determining that the first UE is located outside a network coverage. The first announcement message includes: a discovery message encrypted based on a discovery key and an LTK ID used for indicating an LTK.

Step S62: the discovery key is determined based on the LTK corresponding to the LTK ID. The LTK is received when the first UE is within the network coverage.

In step S61, monitoring the first announcement message may include: the first announcement message sent by second UE is monitored.

In one example, the first UE and the second UE may both be, without limitation to, different kinds of mobile terminals or fixed terminals. For instance, the first UE and the second UE may both be, without limitation to, a mobile phone, a computer, a server, a wearable device, a game console or a multi-media device.

In one example, the first UE is located outside the network coverage while the second UE is within the network coverage. In another example, the first UE is located outside the network coverage while the second UE is within the network coverage; and the second UE is a UE located near the first UE.

In one example, network coverage may refer to coverage of different kinds of networks. For instance, network coverage may be, without limitation to, 4G network coverage, 5G network coverage or other evolutionary network coverage. For example, the first announcement message is sent when the first UE is located outside the 5G network coverage.

In step S62, determining the discovery key may be determining the discovery key for decrypting the discovery message.

The first announcement message includes but is not limited to at least one of the following:

- the discovery message encrypted based on the discovery key;
- the LTK ID indicating the LTK;
- a security algorithm identifier, used for identifying a security algorithm used by the first announcement message;
- a ranging inquiry code used for identifying the first announcement message;
- a nonce, used for determining the discovery key together with the LTK; or
- a timestamp, used for indicating a term of validity of the discovery key.

Here, the nonce may also be used for encrypting the discovery message together with the discovery key.

The discovery message includes at least one of the following:

- a timestamp, used for indicating a term of validity of the discovery key;
- a ranging level ID, used for indicating target UE to be ranged; and ranging requirement information, used for indicating a ranging requirement for ranging.

The discovery message may also include: a target ranging level ID, used for indicating the target UE outside the network coverage to be ranged.

In one example, the timestamp may be included in the discovery message of the first announcement message. In this way, the timestamp may merely be obtained by decrypting the discovery message.

In some examples, the timestamp is included in the first announcement message but is not included in the discovery message. In this way, the timestamp may be obtained by merely performing integrity verification on the first announcement message, which is conducive to deciding on replay attack against the first announcement message on a condition of not decrypting the discovery message.

In some examples, the security algorithm may be any encryption algorithm, which is not limited here.

In some examples, the ranging inquiry code may be used for identifying the target UE indicated in the first announcement message. For instance, different first announcement messages correspond to different ranging inquiry codes; and the different first announcement messages may contain the same or different ranging level IDs.

In one example, if the ranging inquiry code is included in the encrypted discovery message, the ranging inquiry code may be used for indicating the target UE to be ranged; and if the ranging inquiry code is included in the encrypted discovery message but is not included in the encrypted discovery message, the ranging inquiry code may be used for indicating the first announcement message.

The discovery key includes at least one of the following:

a ranging encryption key (REK), used for encrypting the discovery message; and a ranging integrity key (RIK), used for protecting the integrity of the first announcement message.

Here, the discovery message includes sensitive information. The sensitive information is at least a part of information in the discovery message. For instance, the discovery message includes the ranging level ID and the ranging requirement information; and the sensitive information may be ranging time in the ranging requirement information.

In one example, the REK may be used for encrypting the sensitive information in the discovery message.

For instance, if the sensitive information is a part of message in the discovery message, for example, the discovery message includes the ranging level ID and the ranging requirement information, the sensitive information may be the ranging time in the ranging requirement information; and then the REK may be used for encrypting the ranging time, without encrypting information other than the ranging time in the ranging requirement information or the ranging level ID.

For another instance, if the sensitive information is all the message in the discovery message, the REK may be used for encrypting the entire discovery message.

In step S61, the discovery message encrypted based on the discovery key may be: the discovery message encrypted based on the REK in the discovery key.

In step S61, monitoring the first announcement message includes: the first announcement message is monitored at a proximity communication (PC5) interface.

The UE discovery message protection method provided by the example of the disclosure, executed by the first UE, includes: the first announcement message is monitored at the PC5 interface in response to determining that the first UE is located outside the network coverage.

Step S62 may be: the LTK corresponding to the LTK ID is determined based on the LTK ID; and the discovery key is determined based on the LTK. Here, a correspondence relationship between the LTK ID and the LTK may be saved in the first UE. For example, the first UE may obtain the correspondence relationship between the LTK ID and the LTK in advance; and if the first UE obtains the LTK ID from the first announcement message, the LTK corresponding to the LTK ID may be determined based on the LTK ID and the correspondence relationship.

In the example of the disclosure, the first announcement message may be monitored by the first UE outside the network coverage; the first announcement message includes: the discovery message encrypted based on the discovery key and the LTK ID used for indicating the LTK; the discovery key is determined based on the LTK corresponding to the LTK ID; and the LTK is received by the first UE outside the network coverage. In this way, the example of the disclosure enables the first UE outside the network coverage to obtain the encrypted discovery message sent by UE within the network coverage, thus realizing protection for the discovery message, i.e., a protection method is provided for a discovery message in a partial network coverage scenario (such as a partial 5G network coverage scenario), and thus improving user experience.

The UE discovery message protection method provided by the example of the disclosure, executed by the first UE, may include:

within the network coverage, an LTK request carrying an identifier of the first UE is sent to a ranging key management function (RKMF); and within the network coverage, the LTK and the LTK ID returned by the RKMF based on the LTK request is received.

The LTK request carries the identifier of the first UE; and the LTK request is used for requesting the LTK of the first UE and/or the LTK ID corresponding to the LTK.

In this way, in the example of the disclosure, when the first UE is within the network coverage, the LTK may be obtained from the RKMF within the network coverage; and in this way, the discovery message may be conveniently decrypted by the discovery key generated based on the LTK.

It needs to be noted that those skilled in the art may understand that the method provided by the examples of the disclosure may be performed alone or in conjunction with some of the methods in the examples of the disclosure or some of the methods in the related art.

In some examples, the method includes: based on configuration information received within the network coverage, it is determined whether the first UE has the authorization to monitor. The configuration information includes: monitoring authorization of each UE.

In step S61, monitoring the first announcement message includes: on the basis that the first UE has the authorization to monitor, the first announcement message is monitored.

The UE discovery message protection method provided by the example of the disclosure, executed by the first UE, includes:

whether the first UE has the authorization to monitor is determined based on the configuration information received within the network coverage, where the configuration information includes: monitoring authorization of each UE; and on the basis that the first UE has the authorization to monitor, the first announcement message is monitored when the first UE is located outside the network coverage.

The configuration information may be: a service configuration document. The configuration information may be defined by an application level.

In one example, the first UE having the authorization to monitor may be: the first UE has the authorization to monitor announcement messages of any UE; or has the authorization to reserve an announcement message of UE; or has the authorization to monitor the announcement message of the second UE. Here, the second UE is within the network coverage.

In one example, the configuration information includes: the monitoring authorization of all UE. For instance, the configuration information includes: at least one first UE and a corresponding monitoring authorization of the first UE. The monitoring authorization includes but is not limited to at least one of the following: the first UE having the authorization to monitor; the first UE having no authorization to monitor; the first UE having the authorization to monitor other first UE; and the first UE having no authorization to monitor other UE. Here, the first UE having the authorization to monitor may be: the first UE having the authorization to monitor all UE or any UE within the network coverage.

For example, if the configuration information includes: the identifier of at least one first UE and the corresponding monitoring authorization of the first UE. When the first UE is outside the network coverage, whether the first UE has the monitoring authorization is determined based on the identifier of the first UE and the configuration information; and if the first UE determines that the first UE has the authorization to monitor the second UE, it may monitor, at the PC5 interface, the first announcement message sent by the second UE.

In this way, the first UE may monitor the first announcement message sent by the second UE when it is determined that the first UE has the monitoring authorization; and in this way, the discovery message may be further protected in a partial network coverage scenario.

It needs to be noted that those skilled in the art may understand that the method provided by the examples of the disclosure may be performed alone or in conjunction with some of the methods in the examples of the disclosure or some of the methods in the related art.

In step S62, determining the discovery key based on the LTK corresponding to the LTK ID includes:

a middle key such as key derivation (KD) is determined based on the LTK corresponding to the LTK ID; a temporary key such as key derivation for session (KD-SESS) is determined based on the KD; and the REK and/or RIK in the discovery key is determined based on the KD-SESS.

The UE discovery message protection method provided by the example of the disclosure, executed by the first UE, includes: the KD is determined based on the LTK corresponding to the LTK ID; the KD-SESS is determined based on the KD; and the REK and/or RIK in the discovery key is determined based on the KD-SESS.

The UE discovery message protection method provided by the example of the disclosure, executed by the first UE, includes: the KD is determined based on the corresponding LTK and a nonce; the KD-SESS is determined based on the KD and the nonce; and the REK and/or RIK in the discovery key are/is determined based on the KD-SESS and the nonce.

In this way, in the example of the disclosure, the first UE may determine the discovery key used for decrypting the discovery message through the LTK received within the network coverage; and decryption of the discovery message is conveniently completed.

The UE discovery message protection method provided by the example of the disclosure, executed by the first UE, includes: the first announcement message is decrypted based on the discovery key.

Decrypting the first announcement message based on the discovery key includes: integrity verification is performed on the first announcement message based on the RIK in the discovery key; and/or the discovery message is decrypted based on the REK in the discovery key.

Here, decrypting the discovery message includes: sensitive information in the discovery message is decrypted.

The UE discovery message protection method provided by the example of the disclosure, executed by the first UE, includes: the discovery message is decrypted based on the REK in the discovery key.

Figures 7, 8:
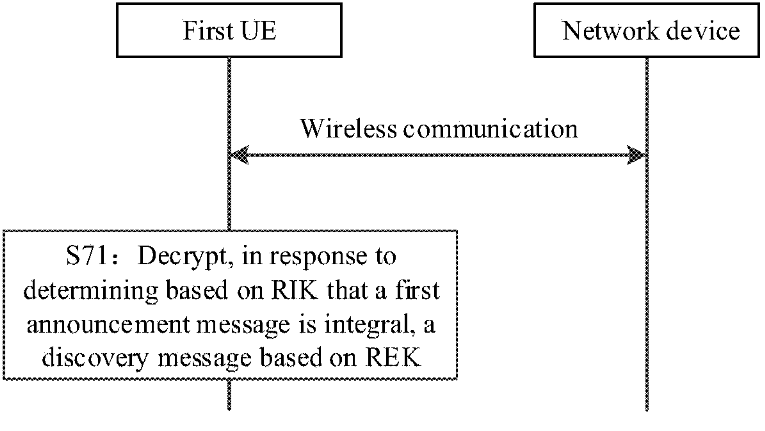
FIG. 7 is a flow chart of a UE discovery message protection method illustrated according to an example.
FIG. 8 is a flow chart of a UE discovery message protection method illustrated according to an example.

As shown in FIG. 7, the UE discovery message protection method provided by the example of the disclosure, executed by the first UE, includes:

Step S71: it is determined that the first announcement message is integral based on the RIK, and the discovery message is decrypted based on the REK.

Here, after determining the RIK and the REK in the discovery key, the first UE may perform integrity verification on the first announcement message; and if the integrity verification is successful, it is determined that the first announcement message is integral, and the first UE decrypts the discovery message based on the REK.

The UE discovery message protection method provided by the example of the disclosure, executed by the first UE, includes:

based on a timestamp and/or a nonce obtained from the first announcement message, whether the first announcement message is under a replay attack is determined; and on the basis that the first announcement message is not under a replay attack, it is determined to send a second announcement message; or on the basis that the first announcement message is under a replay attack, it is determined not to send the second announcement message, where the second announcement message includes a ranging response code corresponding to the ranging inquiry code.

Here, decrypting the first announcement message includes: the integrity verification is performed on the first announcement message and/or the discovery message is decrypted.

If the time stamp is included in the first announcement message but is not included in the discovery message, the time stamp may be obtained directly from the first announcement message; and if the time stamp is included in the discovery message of the first announcement message, the discovery message needs to be decrypted to obtain the time stamp.

For example, if the first UE determines that a current moment is not within a term of validity indicated by the time stamp, and/or receives the same nonce as the previously received nonce in the first announcement message, it is determined that the first announcement message is under the replay attack.

For example, if the first UE determines that the current moment is within the term of validity indicated by the time stamp, and/or has not received the same nonce as the previously received nonce in the first announcement message, it is determined that the first announcement message is not under the replay attack.

The ranging response code may be used for indicating that the first UE receives the first announcement message.

In this way, in the example of the disclosure, the first UE may further obtain the time stamp and/or the nonce from the first announcement message so as to determine whether the first announcement message is under the replay attack, thus enhancing protection for the discovery message. If the first announcement message is not under the replay attack, a second announcement message may be sent to notify the second UE; and the first UE has received the first announcement message. Or, if the first announcement message is under the replay attack, the second UE may be notified by not sending the second announcement message; and the first UE has not successfully obtained the first announcement message.

In some examples, the method further includes: the second announcement message is sent after the first announcement message is received.

A UE discovery message protection method provided by an example of the disclosure and executed by first UE, includes: a second announcement message is sent. The second announcement message carries a ranging response code corresponding to a ranging inquiry code.

A UE discovery message protection method provided by an example of the disclosure and executed by first UE, includes: a first announcement message is sent at a PC5 interface.

In some examples, the first announcement message includes: the ranging inquiry code, used for identifying the first announcement message.

The method includes: the second announcement message is sent on the basis that the ranging inquiry code matches a pre-configured ranging inquiry filter. The second announcement message includes a ranging response code corresponding to the ranging inquiry code.

A UE discovery message protection method provided by an example of the disclosure and executed by first UE, may include: a second announcement message is sent on the basis that a ranging inquiry code matches a pre-configured ranging inquiry filter. The second announcement message includes a ranging response code corresponding to the ranging inquiry code.

Here, the ranging inquiry filter may be used for filtering the first announcement message. If the ranging inquiry filter pre-configured by the first UE matches the ranging inquiry code in the first announcement message, the first announcement message is determined to be the first announcement message to be monitored.

In this way, in the example of the disclosure, the first UE may further filter, through the ranging inquiry filter, first announcement messages corresponding to non-matching ranging inquiry codes, so that the first UE may receive accurate first announcement messages.

Sending the second announcement message includes: the second announcement message protected using the REK and/or the RIK is sent.

A UE discovery message protection method provided by an example of the disclosure and executed by first UE, may include: a second announcement message protected using an REK and/or an RIK is sent at a PC5 interface.

Here, the second announcement message protected using the REK and/or the RIK includes: sensitive information in the second announcement message is encrypted using the REK; and/or integrity protection is performed on the second announcement message using the RIK.

Here, it may be understood that protection includes integrity protection and/or confidentiality protection; and the confidentiality protection is self-defined by the first UE.

Here, the discovery key encrypting the second announcement message is the same as the discovery key decrypting the first announcement message. In this way, when the second UE receives the second announcement message, the second announcement message may be decrypted using the discovery key encrypting the first announcement message.

In the example of the disclosure, the first UE may also announce after encrypting the second announcement message, thus improving the confidentiality of the second announcement message.

A UE discovery message protection method provided by an example of the disclosure and executed by first UE, may include: a second announcement message is sent. The second announcement message includes a ranging response code corresponding to a ranging inquiry code.

In some embodiments, the second announcement message is: the second announcement message protected using an REK and/or an RIK. For the second announcement message, reference may be made to description of other examples of the disclosure, which will not be repeated here.

In some embodiments, the ranging inquiry code may be obtained through the first announcement message.

It needs to be noted that those skilled in the art may understand that the method provided by the examples of the disclosure may be performed alone or in conjunction with some of the methods in the examples of the disclosure or some of the methods in the related art.

The following UE discovery message protection method is executed by second UE, and its description is similar to the description of the above UE discovery message protection methods executed by the first UE. For technical details not disclosed in the example of the UE discovery message protection method executed by the second UE, please refer to the description of the above UE discovery message protection methods executed by the first UE, which will not be illustrated here.

As shown in FIG. 8, a UE discovery message protection method provided by an example of the disclosure, executed by second UE, includes:

step S81: a first announcement message is sent in response to determining that the second UE is within a network coverage. The first announcement message includes: a discovery message encrypted based on a discovery key, and an LTK ID indicating an LTK.

The LTK ID is used for first UE outside the network coverage to determine the LTK corresponding to the LTK ID; and the LTK is used for the first UE to determine the discovery key.

In some examples of the disclosure, the first announcement message is the first announcement message in step S61; the discovery message and the discovery key are respectively the discovery message and the discovery key in step S61; and the LTK ID is the LTK ID in step S61.

For instance, the first announcement message includes but is not limited to at least one of the following:

- the discovery message encrypted based on the discovery key;
- the LTK ID indicating the LTK;
- a security algorithm identifier, used for identifying a security algorithm used by the first announcement message;

a ranging inquiry code used for identifying the first announcement message;

a nonce, used for determining the discovery key together with the LTK; or a timestamp, used for indicating a term of validity of the discovery key.

Here, the nonce may also be used for encrypting the discovery message together with the discovery key.

For instance, the discovery message includes at least one of the following:

a timestamp, used for indicating a term of validity of the discovery key;

a ranging level ID, used for indicating target UE to be ranged; and ranging requirement information, used for indicating a ranging requirement for ranging.

For instance, the discovery key includes at least one of the following:

an REK, used for encrypting the discovery message; and an RIK, used for protecting the integrity of the first announcement message.

Here, the discovery key for the second UE to encrypt the discovery message is obtained from the RKMF, or generated by a KD obtained from the RKMF.

In step S81, sending the first announcement message includes: the first announcement message is sent at the PC5 interface.

A UE discovery message protection method provided by an example of the disclosure and executed by second UE, may include: a first announcement message is sent at a PC5 interface.

In this way, in the example of the disclosure, the first announcement message may be sent by the second UE within the network coverage, so that the first UE located outside the network coverage can monitor the first announcement message, and can determine the discovery key by encryption using the LTK received within the network coverage, thus realizing encryption of the discovery message. In this way, the example of the disclosure enables the first UE outside the network coverage to obtain the encrypted discovery message sent by UE within the network coverage, thus realizing protection for the discovery message, i.e., a protection method is provided for a discovery message in a partial network coverage scenario (such as a partial 5G network coverage scenario), and thus improving user experience.

In step S81, sending the first announcement message may include: the first announcement message is sent based on a received discovery response sent by the RKMF. The discovery response is used for indicating that the second UE has the authorization to announce.

A UE discovery message protection method provided by an example of the disclosure and executed by second UE, may include: a first announcement message is sent based on a received discovery response sent by an RKMF. The discovery response is used for indicating that the second UE has the authorization to announce.

In some examples, before receiving the discovery response, the method may further include: a discovery request carrying an identifier of the second UE is sent to the RKMF. The discovery request is used for requesting on whether the second UE has the authorization to announce.

A UE discovery message protection method provided by an example of the disclosure and executed by second UE, may include: a discovery request carrying an identifier of the second UE is sent to an RKMF. The discovery request is used for requesting on whether the second UE has the authorization to announce.

The discovery request includes: a ranging level ID, used for indicating target UE to be ranged, or target UE used for discovering.

In one example, the target UE is the UE which is determined by the second UE to have the authorization to monitor and/or have the authorization to announce.

The discovery response includes at least one of the following:

a ranging inquiry code, used for indicating the first announcement message;

a ranging response filter, used for matching the ranging response code; or a nonce, used for determining the discovery key together with the LTK.

The discovery response includes one of the following:

an LTK ID, and the discovery key corresponding to the LTK ID;

the LTK ID, and a nonce; or the LTK ID, a KD generating the discovery key, and a nonce corresponding to the KD.

For example, when the second UE needs to announce a message, it sends a discovery request carrying a second identifier to the RKMF to request on whether the second UE has the authorization to announce; if the RKMF determines that the second UE has the authorization to announce, it sends the discovery response to the second UE; and the second UE may send the first announcement message at the PC5 interface based on the discovery response.

In this way, in the example of the disclosure, the second UE may make a request to the RKMF for a authorization to announce the first announcement message, and the second UE will announce the first announcement message when it has the authorization to announce. In this way, confidentiality of the first announcement message may also be improved.

Besides, if the discovery response indicating that the second UE has the authorization to announce may carry the discovery key or the KD generating the discovery key or the nonce, one discovery response may realize two functions of indicating that the second UE has the authorization to announce and sending the discovery key. In this way, a utilization rate of signaling may be improved and power consumption of communication devices may be reduced.

A UE discovery message protection method provided by an example of the disclosure and executed by second UE, may include: KD-SESS is determined based on a KD; and a discovery key is determined based on the KD-SESS.

A UE discovery message protection method provided by an example of the disclosure and executed by second UE, may include: KD-SESS is determined based on a KD and a nonce; and a discovery key is determined based on the KD-SESS and the nonce. Here, determining the discovery key may be: an REK and/or an RIK in the discovery key are/is determined.

In this way, in the example, if the KD is obtained from the RKMF, the discovery key may be generated based on the KD. In this way, a process of the KD generating the discovery key may be applied to the second UE, and a work burden of the RKMF may be reduced.

A UE discovery message protection method provided by an example of the disclosure and executed by second UE, may include: a discovery message is encrypted based on an REK; and/or, integrity protection is performed on the first announcement message based on an RIK.

A UE discovery message protection method provided by an example of the disclosure and executed by second UE, may include: a second announcement message is monitored based on a ranging response filter. The second announcement message includes a ranging response code corresponding to the ranging inquiry code.

Here, the second announcement message may also be an announcement message protected using an REK and/or an RIK. For instance, sensitive information in the second announcement message is encrypted using the REK, and integrity protection is performed on the second announcement message using the RIK.

For the above embodiment, reference may be made to description on the first UE side, which will not be repeated here.

A UE discovery message protection method provided by an example of the disclosure and executed by second UE, may include: a second announcement message is received. The second announcement message includes a ranging response code corresponding to a ranging inquiry code.

In some embodiments, the second announcement message is: a second announcement message protected using an REK and/or an RIK.

In some embodiments, the ranging inquiry code may be obtained through a first announcement message.

It needs to be noted that those skilled in the art may understand that the method provided by the examples of the disclosure may be performed alone or in conjunction with some of the methods in the examples of the disclosure or some of the methods in the related art.

The following UE discovery message protection method is executed by an RKMF, and its description is similar to the description of the above UE discovery message protection method executed by the first UE and/or the second UE. For technical details not disclosed in the example of the UE discovery message protection method executed by the RKMF, please refer to the description of the above UE discovery message protection method executed by the first UE and/or the second UE, which will not be illustrated here.

Figure 9:
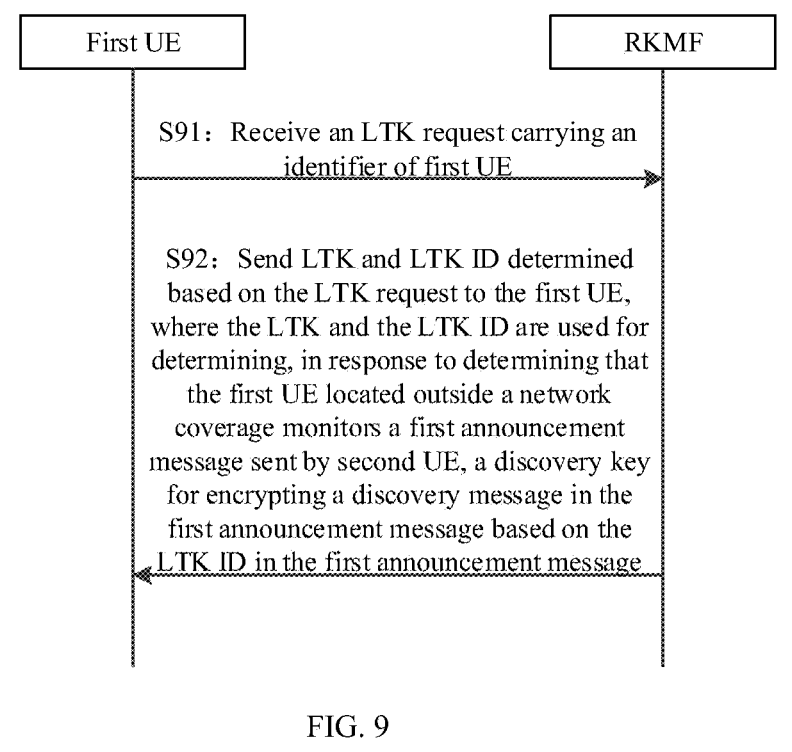

As shown in FIG. 9, a UE discovery message protection method provided by an example of the disclosure and executed by an RKMF, includes:

step S91: an LTK request carrying an identifier of first UE is received; and step S92: an LTK and an LTK ID determined based on the LTK request are sent to the first UE, where the LTK and the LTK ID are used for determining, in response to determining that the first UE located outside a network coverage monitors a first announcement message sent by second UE, a discovery key for encrypting a discovery message in the first announcement message based on the LTK ID in the first announcement message.

In some examples of the disclosure, the LTK request is the LTK request in the above example; the first announcement message is the first announcement message in step S61; the discovery message and the discovery key are respectively the discovery message and the discovery key in step S61; and the LTK ID is the LTK ID in step S61. For instance, the discovery key includes: an REK and/or an RIK.

A UE discovery message protection method provided by an example of the disclosure and executed by an RKMF, includes:

a discovery request sent by second UE is received, where the discovery request includes an identifier of the second UE used for requesting on whether the second UE has the authorization to announce; and it is determined that the second UE has the authorization to announce based on the identifier of the second UE, and a discovery response is sent to the second UE, where the discovery response is used for indicating that the second UE has the authorization to announce.

Here, the RKMF may determine, based on the identifier of the second UE and the configuration information in the discovery request, whether the second UE has the authorization to announce. The configuration information includes: the identifier of at least one UE and the corresponding announcement authorization. The configuration information includes: a service configuration document. The configuration information may be self-defined by an application level.

A UE discovery message protection method provided by an example of the disclosure and executed by an RKMF, includes: the discovery key or the KD generating the discovery key is determined based on the LTK.

In some examples of the disclosure, the discovery response may be the discovery response in the above example.

For instance, the discovery response may include one of the following:

an LTK ID, and the discovery key corresponding to the LTK ID;

the LTK ID, and a nonce; or the LTK ID, a KD generating the discovery key, and a nonce corresponding to the KD.

For another instance, the discovery response includes at least one of the following:

a ranging inquiry code, used for indicating the first announcement message;

a ranging response filter, used for matching the ranging response code; or a nonce, used for determining the discovery key together with the LTK.

In one example, the RKMF may determine, based on the discovery request and the configuration information, the target UE which the second UE has the authorization to announce. The target UE may be considered as the target UE to be ranged.

In some examples, the discovery request includes: a ranging level ID, used for indicating the target UE to be ranged.

The method includes:

verification information is sent to a unified data management (UDM), where the verification information includes the ranging level ID; and a verification result returned by the UDM based on the verification information is received. The verification result includes: a target ranging level ID. The target ranging level ID is used for indicating the target UE outside the network coverage indicated in the ranging level ID.

A UE discovery message protection method provided by an example of the disclosure and executed by an RKMF, includes:

the verification information is sent to the UDM, where the verification information includes the ranging level ID; and the verification result returned by the UDM based on the verification information is received. The verification result includes: a target ranging level ID. The target ranging level ID is used for indicating the target UE outside the network coverage indicated in the ranging level ID.

Here, the verification information is used for requesting for verifying whether the target UE indicated in the ranging level ID is within the network coverage. Here, the target UE may include the first UE; and the ranging level ID may include the identifier of the first UE.

Here, the target UE indicated in the ranging level ID includes: a target ID within the network coverage and/or a target ID located outside the network coverage. The target UE indicated in the target ranging level ID includes: the target UE located outside the network coverage.

For example, the RKMF receives the discovery request sent by the second UE and obtains the ranging level ID in the discovery request; and sends the ranging level ID to the UDM by carrying it in the verification information. The ranging level ID at least includes the identifier of the first UE. Here, the UDM may determine whether the target UE is within the network coverage based on detection of a status of the target UE. If it is determined that at least part of the target UE is located outside the network coverage, it is determined that the verification result is sent to the RKMF. The verification result includes the target ranging level ID, and the target ranging level ID includes the at least part of the target UE located within the network coverage.

In the above example, the UDM may also be used for detecting the status of the target UE, determining whether the target UE is within the network coverage, and sending the verification result of whether the target UE is within the network coverage to the RKMF.

In this way, in the example of the disclosure, the RKMF may, based on the discovery request of the second UE, send the verification information to the UDM to verify whether the target UE indicated in the discovery request is located outside the network coverage; and if yes, it is determined that the second UE may send the first announcement message to enable the UE which has the authorization to monitor to monitor. In this way, transmission of the discovery message may be realized for the UE outside the network coverage.

Determining the discovery key or the KD generating the discovery key based on the LTK includes:

- on the basis that the identifier of the first UE is included in the target ranging level ID and an available key of the first UE is invalid, the discovery key or the KD generating the discovery key is determined based on the LTK.

Any method invalidating the available key may be applied to the example of the disclosure. For instance, invalidation of the available key may be, without limitation to: expiration of validity of the available key.

A UE discovery message protection method provided by an example of the disclosure and executed by an RKMF, may include: on the basis that an identifier of first UE is included in a target ranging level ID and an available key of the first UE is invalid, a discovery key or a KD generating the discovery key is determined based on an LTK.

A UE discovery message protection method provided by an example of the disclosure and executed by an RKMF, may include: on the basis that an identifier of first UE is included in a target ranging level ID and the validity of an available key of the first UE is expired, the discovery key or the KD generating the discovery key is determined based on the LTK.

Here, the identifier of the first UE is included in the target ranging level ID, i.e., the first UE is one of the target UE.

Here, the available key of the first UE is: a discovery key received by the first UE within the network coverage. For example, it may be a discovery key sent by the RKMF received by the first UE within the network coverage.

In this way, in the example of the disclosure, the RKMF may determine the discovery key or the middle key generating the discovery key based on the LTK when it is determined that the first UE is located outside the network coverage and the discovery key received within the network coverage is expired. In this way, the encrypted discovery message sent by the second UE to the first UE is decrypted based on a new discovery key. In this way, waste of resources caused by update of the discovery key when the discovery key does not need to be updated because the first UE is still in the network coverage and/or the available key of the first UE is still valid may be reduced; and network resources and power consumption of communication devices may be saved.

For the above embodiment, reference may be made to description on the first UE side, which will not be repeated here.

It needs to be noted that those skilled in the art may understand that the method provided by the examples of the disclosure may be performed alone or in conjunction with some of the methods in the examples of the disclosure or some of the methods in the related art.

The following UE discovery message protection method is executed by a UDM, and its description is similar to the description of the above UE discovery message protection method executed by the first UE, the second UE and/or the RKMF. For technical details not disclosed in the example of the UE discovery message protection method executed by the UDM, please refer to the description of the above UE discovery message protection method executed by the first UE, the second UE and/or the RKMF, which will not be illustrated here.

The UE discovery message protection method provided by the example of the disclosure, executed by the UDM, may include:

- verification information sent by the RKMF is received, where the verification information includes a ranging level ID and is used for requesting for verifying whether target UE indicated in the ranging level ID is within the network coverage; and
- a verification result is sent to the RKMF. The verification result includes: a target ranging level ID. The target ranging level ID is used for indicating the target UE outside the network coverage indicated in the ranging level ID.

The UE discovery message protection method provided by the example of the disclosure, executed by the UDM, includes:

- based on the ranging level ID, it is determined whether the target UE corresponding to the ranging level ID is within the network coverage; and
- the target ranging level ID is determined based on an identifier of target UE outside the network coverage.

Here, the UDM may determine, based on the identifier of the first UE and the target ranging level ID, whether the first UE is outside the network coverage. If the identifier of the first UE is included in the target ranging level ID, it is determined that the first UE is outside the network coverage.

For the above embodiment, reference may be made to description on the first UE side, which will not be repeated here.

It needs to be noted that those skilled in the art may understand that the method provided by the examples of the disclosure may be performed alone or in conjunction with some of the methods in the examples of the disclosure or some of the methods in the related art.

To further explain any example of the disclosure, some specific embodiments are provided below.

Example 1

First, an application scenario of the UE discovery message protection method is described as follows: the UE discovery message protection method may be introduced to a scenario of a discovery process of safe ranging under 5G network coverage. In the UE discovery message protection method, a security algorithm identifier may be set according to 3GPP TS 33.501. Here, a network device has preconfigured or provided information of to-be-discovered target UE for first UE outside the 5G network coverage. Here, in order to protect communication between the UE and the RKMF, the UE and the RKMF should support safety conditions and steps in Article 5.2.5 of 3GPP TS 33.503. Here, second UE supports a safety algorithm used by the first UE.

Figure 10:
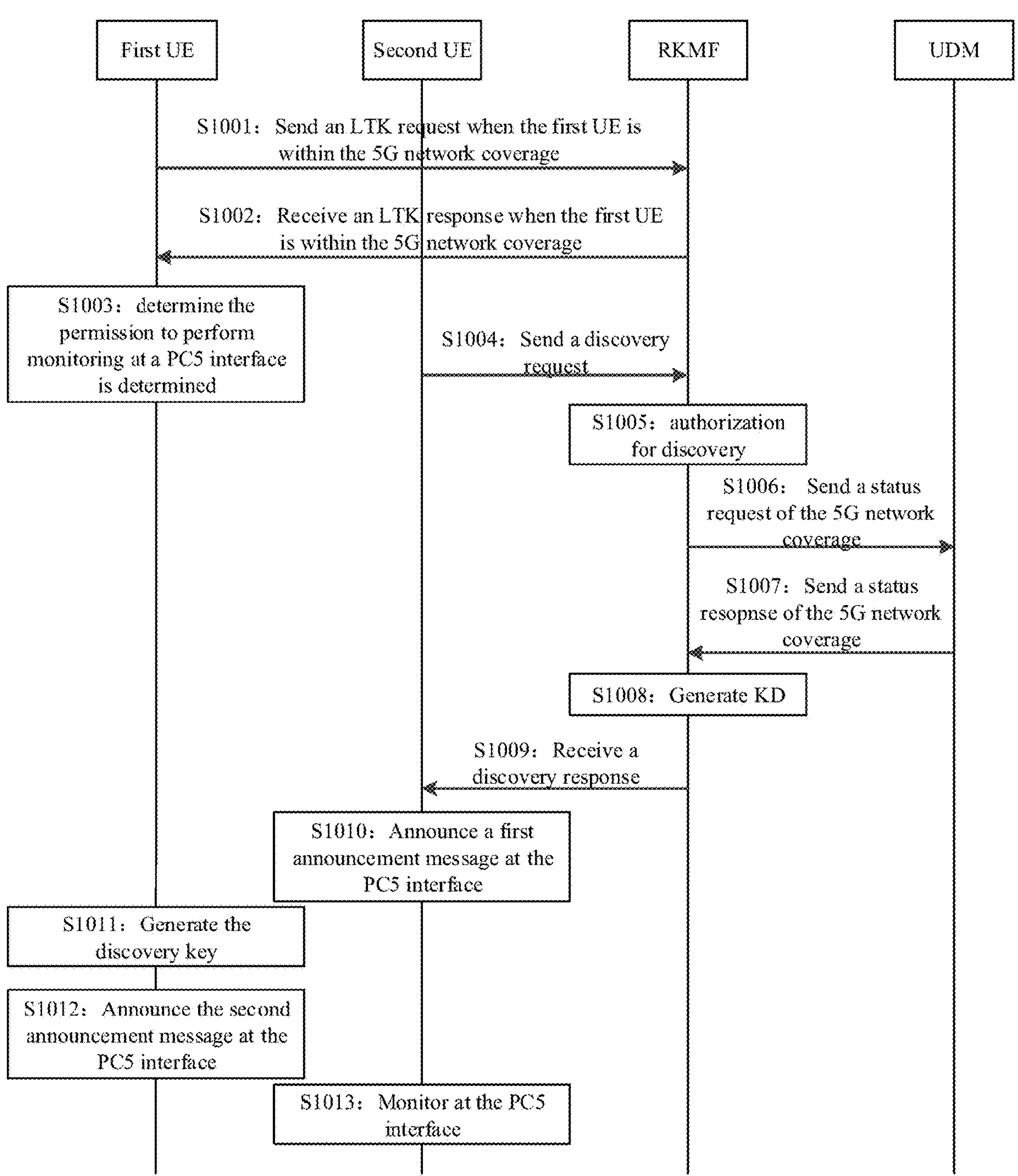
FIG. 10 is a flow chart of a UE discovery message protection method illustrated according to an example.

As shown in FIG. 10, an example of the disclosure provides a UE discovery message protection method, executed by communication devices. The communication devices include: first UE, second UE, an RKMF and a UDM. The method includes:

step S1001: an LTK request is sent when the first UE is within the 5G network coverage.

In an optional example, when the first UE is within the 5G network coverage, the LTK request carrying an identifier of the first UE is sent, so as to obtain an LTK from the RKMF.

Step S1002: an LTK response is received when the first UE is within the 5G network coverage.

In an optional example, before step S132, after receiving the LTK request, the RKMF generates and sends the LTK of the first UE and an LTK ID.

In an optional example, the LTK response sent by the RKMF is received when the first UE is within the 5G network coverage. The LTK response includes: the LTK corresponding to the identifier of the first UE and the LTK ID.

Step S1003: the authorization to perform monitoring at a PC5 interface is determined.

In an optional example, when the first UE receives the LTK and the LTK ID, it is determined, based on configuration information obtained within the 5G network coverage, that it has the authorization to monitor outside the 5G network coverage.

Step S1004: a discovery request is sent.

In an optional example, the second UE is within the 5G network coverage, and by sending a discovery request carrying an identifier of the second UE to the RKMF, the second UE requests to announce at the PC5 interface.

Step S1005, authorization for discovery.

In an optional example, the RKMF discovers target UE based on the discovery request and a service configuration document. The service configuration document may be defined by an application level.

Step S1006: a status request of the 5G network coverage is sent.

In an optional example, in order to verify whether all the target UE of the second UE is within the 5G network coverage, the RKMF sends a ranging level ID to the UDM. Here, the ranging level ID includes an identifier of the target UE.

Step S1007: a status response of the 5G network coverage is sent.

In an optional example, the UDM detects statues of all target UE, and sends a verification result to the RKMF. If the first UE is one of the target UE of the second UE, the UDM determines that the first UE is located outside the 5G network coverage.

Here, the verification result may be considered as a status response. Here, when the UDM determines the target UE is within the 5G network coverage, it sends the verification result carrying a target ranging level ID. The target ranging level ID indicates the target UE outside the network coverage indicated in the ranging level ID.

Step S1008: a KD is generated.

In an optional example, if the RKMF determines, based on the status response sent by the UDM, that a discovery key distributed by the RKMF to the first UE is invalid, the RKMF generates a new discovery key for the first UE. The RKMF generates the KD of the first UE based on the LTK of the first UE according to a key derivation function (KDF) specified in appendix B of TS 33.220.

Step S1009: a discovery response is received.

In an optional example, the RKMF sends to the second UE the discovery response, including the LTK ID of the first UE, a ranging inquiry code, a ranging response filter, the KD, a nonce used for deriving the discovery key and a security algorithm identifier.

Step S1010: a first announcement message is announced at the PC5 interface.

The first announcement message includes: the ranging inquiry code, a time stamp, the ranging level ID and ranging requirement information. The first announcement message further includes: the LTK ID and the nonce used for deriving the discovery key. Here, at least one of the ranging inquiry code, the time stamp, the target ranging level ID and the ranging requirement information is the information in the discovery message in the above example.

In an optional example, the second UE first uses the REK to encrypt the sensitive information in the first announcement message; then the second UE uses the RIK to perform integrity protection for the encrypted discovery message of the sensitive information, the LTK ID of the first UE, and the nonce used for deriving the discovery key, so as to obtain the first announcement message; and then the second UE announces the first announcement message at the PC5 interface. The sensitive information is at least part of the discovery message.

Step S1011: the discovery key is generated.

In an optional example, after receiving the first announcement messages from the second UE, the first UE calculates the REK and the RIK based on the nonce and the LTK. The first UE uses the newly generated RIK to first verify the integrity of the first announcement message. If the first announcement message is modified, the first UE will stop the first announcement message of the second UE. Then the first UE decrypts the first announcement message. In addition, the first UE may check the time stamp and nonce of integrity protection. If the time stamp and/or nonce indicates a replay attack, the first UE stops the first announcement message of the second UE.

Step S1012: the second announcement message is announced at the PC5 interface.

In an optional example, if the first UE determines that the ranging inquiry code of the second UE and the ranging inquiry filter pre-configured by the first UE match, the second announcement message including the corresponding ranging response code is announced at the PC5 interface. The second announcement message is also protected by the REK and the RIK.

Step S1013: monitoring is performed at the PC5 interface.

In an optional example, the second UE uses the ranging response filter sent by the RKMF to monitor at the PC5 interface.

Example 2

An example of the disclosure provides a key derivation method.

Step A: a KD is calculated based on an LTK, and input of KDF should be constituted by the following parameters:

FC=0x58;

P0=Nonce_1;

L0=length of Nonce_1 (i.e. 0x00 0x03);

P1=Nonce_2;

L1=length of Nonce_2 (i.e. 0x00 0x10);

P2=Nonce_3;

L2=length of Nonce_3 (i.e. 0x00 0x10).

Here, an input key should be a 256-bit LTK.

Step B: KD-SESS is calculated based on the KD, and input of the KDF should be constituted by the following parameters:

FC=0x5E;

P0=Nonce_4;

L0=length of Nonce_4 (i.e. 0x00 0x10);

P1=Nonce_5;

L1=length of Nonce_5 (i.e. 0x00 0x10).

Here, an input key should be a 256-bit KD.

Step C: the RIK or REK is calculated based on the KD-SESS, and input of the KDF should be constituted by the following parameters:

FC=0x5B;

P0=0x00 if REK is being derived or 0x01 if RIK is being derived;

L0=length of P0 (i.e.0x00 0x01);

P1=algorithm identity;

L1=length of algorithm identity (i.e.0x00 0x01);

Note: Void.

Here, an input key should be a 256-bit KD-SESS.

Here, for an input key with a length of n bits, n is smaller than or equal to 256; and n least significant bits in the 256 bits output by the KDF should be used as the input key.

It needs to be noted that those skilled in the art may understand that the method provided by the examples of the disclosure may be performed alone or in conjunction with some of the methods in the examples of the disclosure or some of the methods in the related art.

Figure 11:
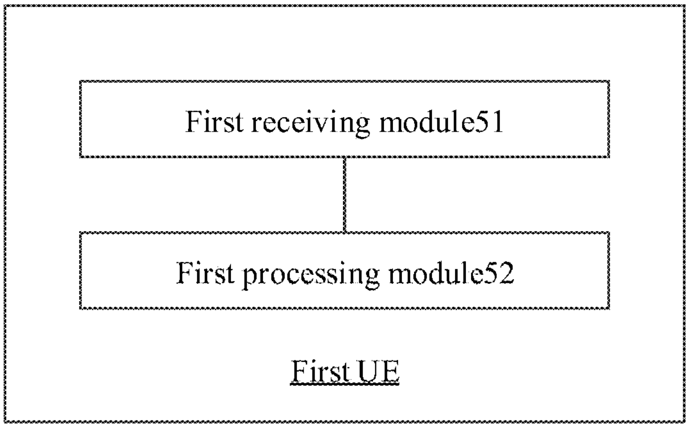
FIG. 11 is a block diagram of a UE discovery message protection apparatus illustrated according to an example.

As shown in FIG. 11, an example of the disclosure provides a UE discovery message protection apparatus, applied to first UE and including:

- a first receiving module 51, configured to monitor a first announcement message in response to determining that the first UE is located outside a network coverage, where the first announcement message includes: a discovery message encrypted based on a discovery key and an LTK ID used for indicating an LTK; and
- a first processing module 52, configured to determine the discovery key based on the LTK corresponding to the LTK ID, where the LTK is received when the first UE is within the network coverage.

A UE discovery message protection apparatus provided by an example of the disclosure and applied to first UE, may include:

- a first processing module 52, configured to determine whether the first UE has the authorization to monitor based on configuration information received within the network coverage, where the configuration information includes: monitoring authorization of each UE; and
- a first receiving module 51, configured to monitor, on the basis that the first UE has the authorization to monitor, a first announcement message when the first UE is located outside the network coverage.

A UE discovery message protection apparatus provided by an example of the disclosure and applied to first UE, may include: a first receiving module 51, configured to monitor a first announcement message at a PC5 interface.

A UE discovery message protection apparatus provided by an example of the disclosure and applied to first UE, may include:

- a first sending module, configured to, within the network coverage, send an LTK request carrying an identifier of the first UE to an RKMF; and
- a first receiving module 51, configured to, within the network coverage, receive the LTK and an LTK ID returned by the RKMF based on the LTK request.

In some examples, the discovery message includes at least one of the following:

- a ranging level ID, used for indicating target UE to be ranged; and
- ranging requirement information, used for indicating a ranging requirement for ranging.

In some examples, the discovery key at least includes one of the following:

- an REK, used for encrypting the discovery message; and
- an RIK, used for protecting the integrity of the first announcement message.

The UE discovery message protection apparatus provided by the example of the disclosure, applied to first UE, may include: the first processing module 52, configured to determine, based on the RIK, that the first announcement message is integral, and decrypt the discovery message based on the REK.

The UE discovery message protection apparatus provided by the example of the disclosure, applied to first UE, may include: the first processing module 52, configured to determine, based on a timestamp and/or a nonce obtained from the first announcement message, whether the first announcement message is under a replay attack.

The first processing module 52 is configured to determine, on the basis that the first announcement message is not under a replay attack, to send a second announcement message, where the second announcement message includes a ranging response code corresponding to a ranging inquiry code.

The UE discovery message protection apparatus provided by the example of the disclosure, applied to first UE, may include: the first processing module 52, configured to determine, based on a timestamp and/or a nonce obtained from the first announcement message, whether the first announcement message is under a replay attack.

The first processing module 52 is configured to determine, on the basis that the first announcement message is under a replay attack, not to send a second announcement message.

In some examples, the first announcement message includes: a ranging inquiry code used for identifying the first announcement message.

The UE discovery message protection apparatus provided by the example of the disclosure, applied to first UE, may include: the first sending module, configured to send, on the basis that the ranging inquiry code matches with a pre-configured ranging inquiry filter, a second announcement message, where the second announcement message includes a ranging response code corresponding to the ranging inquiry code.

The UE discovery message protection apparatus provided by the example of the disclosure, applied to first UE, may include: the first sending module, configured to send the second announcement message protected using the REK and/or the RIK.

The UE discovery message protection apparatus provided by the example of the disclosure, applied to first UE, may include: the first sending module, configured to send the second announcement message, where the second announcement message includes the ranging response code corresponding to the ranging inquiry code.

In some examples, the second announcement message is: the second announcement message protected using an REK and/or an RIK.

Figure 12:
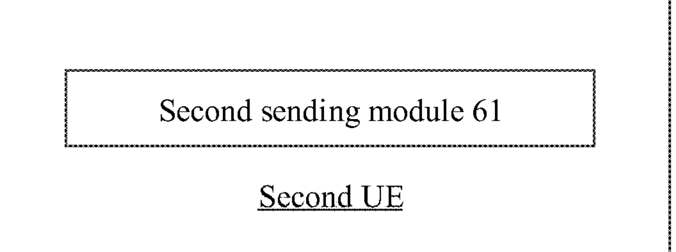
FIG. 12 is a block diagram of a UE discovery message protection apparatus illustrated according to an example.

As shown in FIG. 12, an example of the disclosure provides a UE discovery message protection apparatus, applied to second UE and including:

- a second sending module 61, configured to send, in response to determining that the second UE is within a network coverage, a first announcement message, where the first announcement message includes: a discovery message encrypted based on a discovery key and an LTK ID used for indicating an LTK.

The LTK ID is used for first UE outside the network coverage to determine the LTK corresponding to the LTK ID, and the LTK is used for the first UE to determine the discovery key.

The UE discovery message protection apparatus provided by the example of the disclosure, applied to second UE, may include: the second sending module 61, configured to send the first announcement message at a PC5 interface.

The UE discovery message protection apparatus provided by the example of the disclosure, applied to second UE, may include: the second sending module 61, configured to send, based on a received discovery response sent by an RKMF, the first announcement message, where the discovery response is used for indicating that the second UE has the authorization to announce.

The UE discovery message protection apparatus provided by the example of the disclosure, applied to second UE, may include: the second sending module 61, configured to send a discovery request carrying an identifier of the second UE to the RKMF, where the discovery request is used for requesting on whether the second UE has the authorization to announce.

In some examples, the discovery response includes one of the following:

- an LTK ID, and the discovery key corresponding to the LTK ID;
- the LTK ID, and a nonce; or
- the LTK ID, a KD generating the discovery key, and a nonce corresponding to the KD.

The UE discovery message protection apparatus provided by the example of the disclosure, applied to second UE, may include: the second processing module, configured to determine the KD-SESS based on the KD; and determine the discovery key based on the KD-SESS.

The UE discovery message protection apparatus provided by the example of the disclosure, applied to second UE, may include: the second processing module, configured to determine the KD-SESS based on the KD and a nonce; and determine the discovery key based on the KD-SESS and the nonce.

In some examples, the discovery key includes: the REK and/or the RIK.

The UE discovery message protection apparatus provided by the example of the disclosure, applied to second UE, may include: the second processing module, configured to encrypt the discovery message based on the REK; and perform integrity protection on the first announcement message based on the RIK.

In some examples, the discovery response includes at least one of the following:

- a ranging inquiry code, used for indicating the first announcement message;
- a ranging response filter, used for matching the ranging response code; or
- a nonce, used for determining the discovery key together with the LTK.

The UE discovery message protection apparatus provided by the example of the disclosure, applied to second UE, may include: the second receiving module, configured to monitor a second announcement message based on the ranging response filter. The second announcement message includes a ranging response code corresponding to the ranging inquiry code.

In some examples, the discovery message further includes at least one of the following:

- a ranging level ID, used for indicating target UE to be ranged; and
- ranging requirement information, used for indicating a ranging requirement for ranging.

The UE discovery message protection apparatus provided by the example of the disclosure, applied to second UE, may include: the second receiving module, configured to receive the second announcement message. The second announcement message includes the ranging response code corresponding to the ranging inquiry code.

In some examples, the second announcement message is: the second announcement message protected using the REK and/or the RIK.

In some embodiments, the ranging inquiry code may be obtained through the first announcement message.

Figure 13:
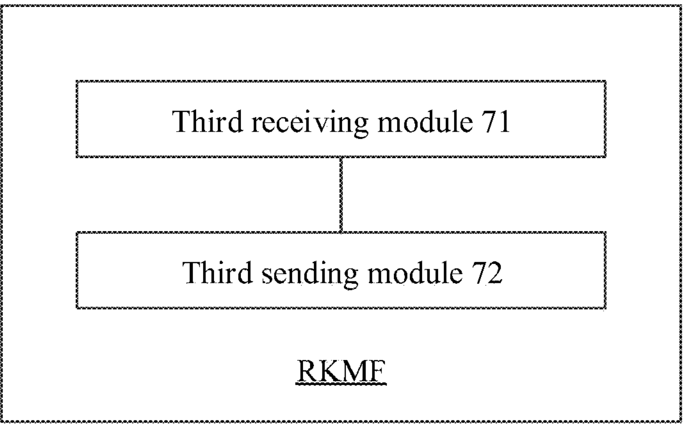
FIG. 13 is a block diagram of a UE discovery message protection apparatus illustrated according to an example.

As shown in FIG. 13, an example of the disclosure provides a UE discovery message protection apparatus, applied to an RKMF and including:

- a third receiving module 71, configured to receive an LTK request carrying an identifier of first UE; and
- a third sending module 72, configured to send an LTK and an LTK ID determined based on the LTK request to the first UE, where the LTK and the LTK ID are used for determining, in response to determining that the first UE located outside a network coverage monitors a first announcement message sent by second UE, a discovery key for encrypting a discovery message in the first announcement message based on the LTK ID in the first announcement message.

The UE discovery message protection apparatus provided by the example of the disclosure, applied to the RKMF, may include:

- the third receiving module 71, configured to receive a discovery request sent by the second UE, where the discovery request includes an identifier of the second UE used for requesting on whether the second UE has the authorization to announce; and
- a third processing module, configured to send, in response to determining based on the identifier of the second UE that the second UE has the authorization to announce, a discovery response to the second UE, where the discovery response is used for indicating that the second UE has the authorization to announce.

The UE discovery message protection apparatus provided by the example of the disclosure, applied to the RKMF, may include: a third processing module, configured to determine the discovery key or the KD generating the discovery key based on the LTK.

The discovery response includes one of the following: the LTK ID, and the discovery key corresponding to the LTK ID; the LTK ID, and a nonce; or the LTK ID, a KD generating the discovery key, and a nonce corresponding to the KD.

In some examples, the discovery response includes at least one of the following:

a ranging inquiry code, used for indicating the first announcement message;

a ranging response filter, used for matching the ranging response code; or a nonce, used for determining the discovery key together with the LTK.

In some examples, the discovery request includes: a ranging level ID, used for indicating the target UE to be ranged.

The UE discovery message protection apparatus provided by the example of the disclosure, applied to the RKMF, may include:

a third sending module 72, configured to send verification information to a unified data management (UDM), where the verification information includes the ranging level ID; and the third receiving module 71, configured to receive a verification result returned by the UDM based on the verification information, where the verification result includes: a target ranging level ID, used for indicating the target UE outside the network coverage indicated in the ranging level ID.

The UE discovery message protection apparatus provided by the example of the disclosure, applied to the RKMF, may include: the third processing module, configured to determine, on the basis that the identifier of the first UE is included in the target ranging level ID and that an available key of the first UE is invalid, the discovery key or the middle key KD generating the discovery key based on the LTK.

An example of the disclosure provides a UE discovery message protection apparatus, applied to a UDM, and including:

a fourth receiving module, configured to receive verification information sent by an RKMF, where the verification information includes a ranging level ID and is used for requesting for verifying whether target UE indicated in the ranging level ID is within the network coverage; and a fourth sending module, configured to send a verification result to the RKMF. The verification result includes: a target ranging level ID. The target ranging level ID is used for indicating the target UE outside the network coverage indicated in the ranging level ID.

The UE discovery message protection apparatus provided by the example of the disclosure, applied to UDM, may include:

a fourth processing module, configured to determine, based on the ranging level ID, whether the target UE corresponding to the ranging level ID is within the network coverage; and determine the target ranging level ID based on an identifier of target UE outside the network coverage.

It needs to be noted that those skilled in the art may understand that the apparatus provided by the examples of the disclosure may be executed alone or in conjunction with some of the apparatus in the examples of the disclosure or some of the apparatus in the related art.

With respect to the apparatus in the above example, the specific manner in which each module performs an operation has been described in detail in the examples relating to the method, and will not be described in detail here.

An example of the disclosure provides a communication device, including:

a processor; and a memory used for storing a processor executable instruction.

The processor is configured to: when running the executable instruction, implement the method according to any one of the examples of the disclosure.

In one example, the communication device may include but is not limited to at least one of the following: a core network device, an access network device, and UE. The UE may be the first UE or second UE in the above examples; and the core network device may be the RKMF in the above examples.

The processor may include various types of storage media. The storage medium may be a non-transitory computer storage medium capable of continuing to memorize information stored on it after user equipment is powered down.

The processor may be connected to the memory via a bus or the like for reading an executable program stored on the memory, e.g., at least one of the methods as shown in FIG. 6 to FIG. 10.

An example of the disclosure further provides a computer storage medium. The computer storage medium stores a computer executable program. The executable program, when executed by a processor, implements the method according to any one of the examples of the disclosure, for instance, at least one of the methods as shown in FIG. 6 to FIG. 10.

In regard to the apparatus in the above example, specific manners of execution and operation of the modules have been described in detail in the example related to the method in the first aspect, and elaboration and description will not be made here.

Figure 14:
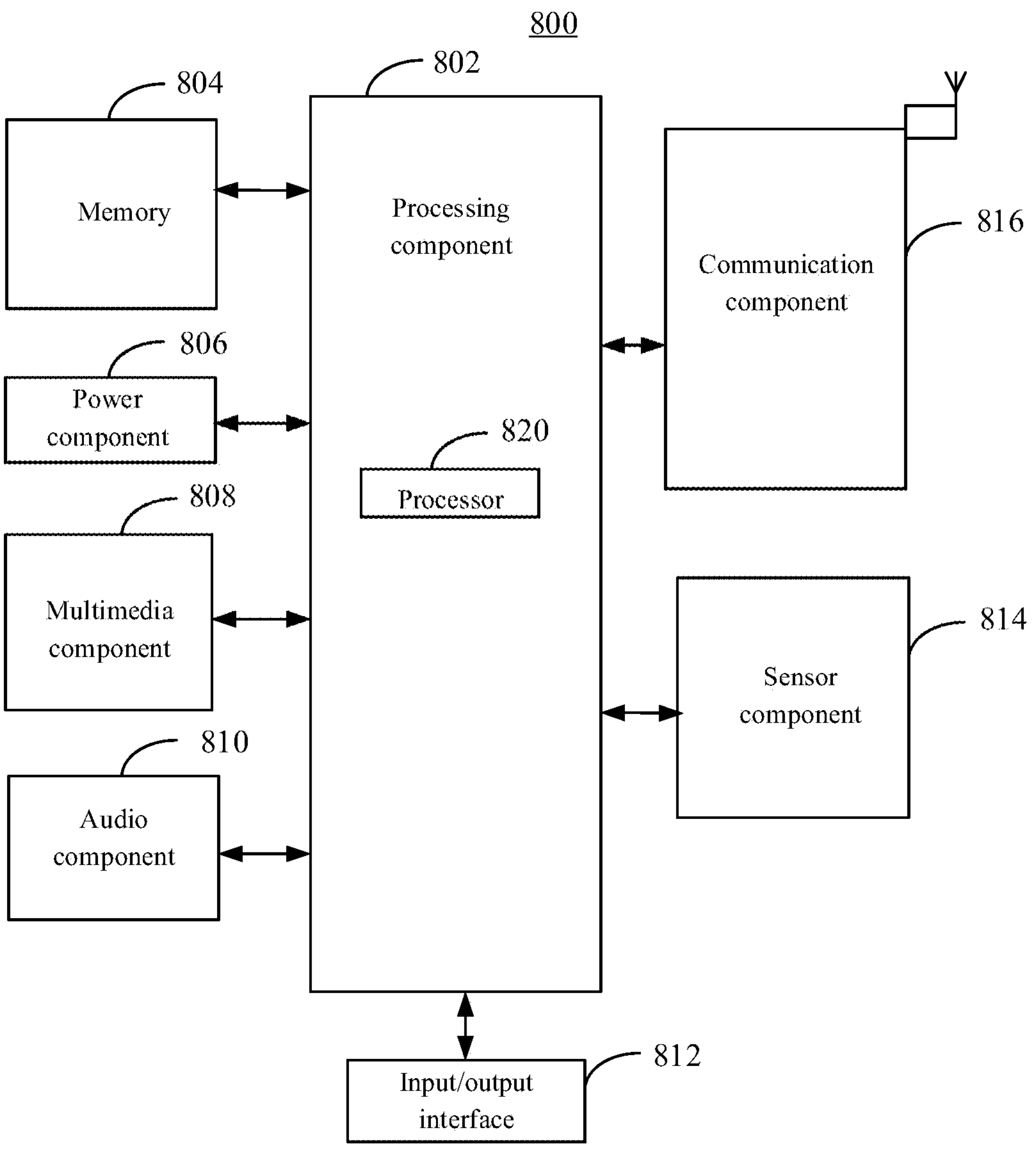
FIG. 14 is a block diagram of UE illustrated according to an example.

FIG. 14 is a block diagram of user equipment 800 illustrated according to an example. For instance, the user equipment 800 may be a mobile phone, a computer, a digital broadcasting terminal, a messaging device, a game console, a tablet device, a medical device, a fitness device, a personal digital assistant, etc.

With reference to FIG. 14, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the user equipment 800, such as operations associated with display, telephone calls, data communication, camera operations, and recording operations. The processing component 802 may include one or more processors 820 to execute instructions to complete all or part of the steps of the above-mentioned method. In addition, the processing component 802 may include one or more modules to facilitate interactions between the processing component 802 and other components. For example, the processing component 802 may include a multimedia module to facilitate an interaction between the multimedia component 808 and the processing component 802.

The memory 804 is configured to store various types of data to support operation of the user equipment 800. Typical examples of these data include instructions of any application program or method operated on the user equipment 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power to the components of the user equipment 800. The power component 806 may include a power management system, one or more power supplies, and other components associated with generating, managing, and distributing power for the user equipment 800.

The multimedia component 808 includes a screen that provides an output interface between the user equipment 800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The touch sensor may not only sense a boundary of a touch or swipe action, but also detect a duration and pressure related to the touch or swipe operation. In some examples, the multimedia component 808 includes a front camera and/or a rear camera. When the user equipment 800 is in an operation mode, such as a shooting mode or a video mode, the front camera and/or the rear camera may receive external multimedia data. Each of the front camera and rear camera may be a fixed optical lens system or have a focal length and optical zoom capabilities.

The audio component 810 is configured to output and/or input audio signals. For example, the audio component 810 includes a microphone (MIC), and when the user equipment 800 is in an operation mode, such as a call mode, a recording mode, and a voice recognition mode, the microphone is configured to receive an external audio signal. The received audio signal may be further stored in the memory 804 or sent via the communication component 816. In some examples, the audio component 810 further includes a speaker for outputting audio signals.

The I/O interface 812 provides an interface between the processing component 802 and a peripheral interface module. The above-mentioned peripheral interface module may be a keyboard, a click wheel, buttons, and the like. These buttons may include, but are not limited to: a home button, a volume button, a start button, and a lock button.

The sensor component 814 includes one or more sensors for providing the user equipment 800 with various aspects of state assessment. For example, the sensor component 814 may detect an open/closed state of the user equipment 800 and relative positioning of the components. For example, the component is a display and a keypad of the user equipment 800. The sensor component 814 may also detect position change of the user equipment 800 or a component of the user equipment 800, the presence or absence of contact between the user and the user equipment 800, an orientation or acceleration/deceleration of the user equipment 800, and a temperature change of the user equipment 800. The sensor component 814 may also include a proximity sensor configured to detect the presence of a nearby object when there is no physical contact. The sensor component 814 may also include a light sensor, such as a CMOS or CCD image sensor, for use in imaging applications. In some examples, the sensor component 814 may also include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as WiFi, 2G or 3G, 4G or 5G, or a combination of them. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the user equipment 800 may be implemented by one or more application specific integrated circuits (ASICs), digital signal processors (DSP), digital signal processing devices (DSPD), programmable logic devices (PLD), field programmable gate arrays (FPGAs), controllers, microcontrollers, microprocessors or other electronic elements, so as to implement a power supply method of the above-mentioned electronic device.

In a fourth aspect, in an example of the disclosure, a non-transitory computer readable storage medium including instructions is further provided, for example, a memory 804 including instructions. The above instructions may be executed by a processor 820 of a user equipment 800 to complete a power supply method of the above-mentioned electronic device. For example, the non-transitory computer readable storage medium may be a ROM, a random access memory (RAM), a CD-ROM, a magnetic tape, a floppy disk, an optical data storage device, etc.

Figure 15:
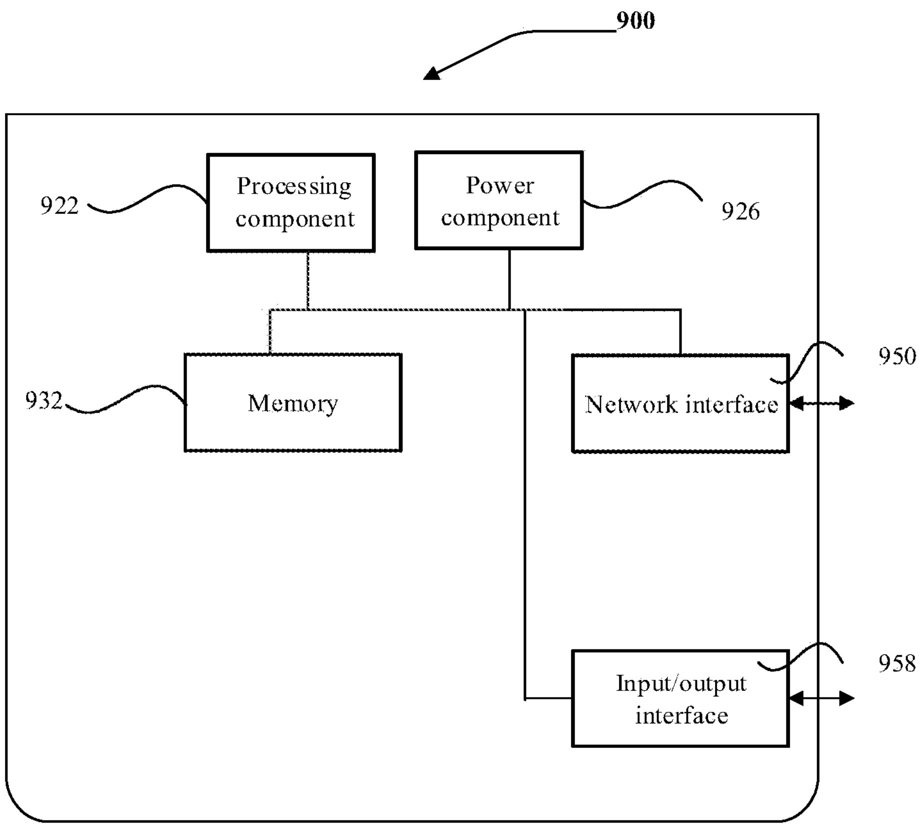
FIG. 15 is a block diagram of a base station illustrated according to an example.

As shown in FIG. 15, an example of the disclosure illustrates a structure of a base station. For instance, the base station 900 may be provided as a network side device. Referring to FIG. 15, the base station 900 includes a processing component 922, which further includes one or a plurality of processors, and memory resources represented by a memory 932 which is used for storing an instruction that may be executed by the processing component 922, for instance, an application program. The application program stored in the memory 932 may include one or more than one modules each corresponding to one set of instructions. In addition, the processing component 922 is configured to execute the instructions to execute any method applied to the base station according to the above description, for the method shown in FIG. 4 to FIG. 10.

The base station 900 may also include a power component 926 configured to perform power management of the base station 900, a wired or wireless network interface 950 configured to connect the base station 900 to a network, and an input/output (I/O) interface 958. The base station 900 may operate an operating system based on an operating system stored in the memory 932, such as Windows Server™, Mac OS X™, Unix™, Linux™, FreeBSD™ or the like.

After considering the specification and practicing the disclosure disclosed here, those of skill in the art will easily think of other embodiment schemes of the disclosure. The present application is intended to cover any variations, uses, or adaptive changes of the disclosure. These variations, uses, or adaptive changes follow the general principles of the disclosure and include common knowledge or conventional technical means in the art that are not disclosed in the disclosure. The specification and the examples are to be regarded as examples merely, and the true scope and spirit of the disclosure are pointed out by the appended claims.

It needs to be understood that the disclosure is not limited to the precise structure that has been described above and shown in the drawings, and various modifications and changes can be made without departing from its scope. The scope of the disclosure is merely limited by the appended claims.

Embodiment 1. A UE discovery message protection method, executed by a first user equipment (UE), and comprising:

monitoring, in response to determining that the first UE is located outside a network coverage, a first announcement message, wherein the first announcement message comprises: a discovery message encrypted based on a discovery key and an long-term key (LTK) identifier (ID) used for indicating a long-term key (LTK); and determining the discovery key based on the LTK corresponding to the LTK ID, wherein the LTK is received in response to determining that the first UE is within the network coverage.

Embodiment 2. The method according to embodiment 1, comprising:

determining, based on configuration information received within the network coverage, whether the first UE has the authorization to monitor, wherein the configuration information comprises: monitoring authorization of each UE; wherein monitoring the first announcement message comprises:

monitoring, on the basis that the first UE has the authorization to monitor, the first announcement message.

Embodiment 3. The method according to embodiment 1, wherein monitoring the first announcement message comprises:

monitoring the first announcement message at a proximity communication (PC5) interface.

Embodiment 4. The method according to embodiment 1, comprising:

sending, within the network coverage, an LTK request carrying an identifier of the first UE to a ranging key management function (RKMF); and receiving, within the network coverage, the LTK and the LTK ID returned by the RKMF based on the LTK request.

Embodiment 5. The method according to any one of embodiments 1 to 4, wherein the discovery message comprises at least one of the following:

a ranging level ID, used for indicating target UE to be ranged; and ranging requirement information, used for indicating a ranging requirement for ranging.

Embodiment 6. The method according to any one of embodiments 1 to 4, wherein the discovery key at least comprises one of the following:

a ranging encryption key (REK), used for encrypting the discovery message; and a ranging integrity key (RIK), used for protecting the integrity of the first announcement message.

Embodiment 7. The method according to embodiment 6, comprising:

determining, based on the RIK, that the first announcement message is integral, and decrypting, the discovery message based on the REK.

Embodiment 8. The method according to embodiment 7, further comprising:

determining, based on a timestamp and/or a nonce obtained from the first announcement message, whether the first announcement message is under a replay attack;

determining, on the basis that the first announcement message is not under a replay attack, to send a second announcement message; or determining, on the basis that the first announcement message is under a replay attack, not to send the second announcement message; wherein the second announcement message comprises a ranging response code corresponding to a ranging inquiry code.

Embodiment 9. The method according to embodiment 1, wherein the first announcement message comprises: a ranging inquiry code, used for identifying the first announcement message; and the method comprises:

sending, on the basis that the ranging inquiry code matches with a pre-configured ranging inquiry filter, a second announcement message, wherein the second announcement message comprises a ranging response code corresponding to the ranging inquiry code.

Embodiment 10. The method according to embodiment 8 or 9, wherein sending the second announcement message comprises:

sending the second announcement message protected using the REK and/or the RIK.

Embodiment 11. A UE discovery message protection method, executed by second user equipment (UE), and comprising:

sending, in response to determining that the second UE is within a network coverage, a first announcement message, wherein the first announcement message comprises: a discovery message encrypted based on a discovery key and an LTK ID used for indicating a long-term key (LTK); wherein the LTK ID is used for first UE outside the network coverage to determine the LTK corresponding to the LTK ID, and the LTK is used for the first UE to determine the discovery key.

Embodiment 12. The method according to embodiment 11, wherein sending the first announcement message comprises:

sending the first announcement message at a proximity communication PC5 interface.

Embodiment 13. The method according to embodiment 11 or 12, wherein sending the first announcement message comprises:

sending, based on a received discovery response sent by a ranging key management function (RKMF), the first announcement message, wherein the discovery response is used for indicating that the second UE has the authorization to announce.

Embodiment 14. The method according to embodiment 13, comprising:

sending a discovery request carrying an identifier of the second UE to the RKMF, wherein the discovery request is used for requesting on whether the second UE has the authorization to announce.

Embodiment 15. The method according to embodiment 13, wherein the discovery response comprises one of the following:

the LTK ID, and the discovery key corresponding to the LTK ID;

the LTK ID, and a nonce; or the LTK ID, a KD generating the discovery key, and a nonce corresponding to the KD.

Embodiment 16. The method according to embodiment 15, comprising:

determining a temporary KD-SESS based on the KD; and determining the discovery key based on the KD-SESS.

Embodiment 17. The method according to embodiment 16, wherein the discovery key comprises: a ranging encryption key (REK) and/or a ranging integrity key (RIK); and the method comprises at least one of the following:

encrypting the discovery message based on the REK; and performing integrity protection on the first announcement message based on the RIK.

Embodiment 18. The method according to embodiment 13, wherein the discovery response comprises at least one of the following:

a ranging inquiry code, used for identifying the first announcement message;

a ranging response filter, used for matching the ranging response code; or a nonce, used for determining the discovery key together with the LTK.

Embodiment 19. The method according to embodiment 18, further comprising:

monitoring, based on the ranging response filter, a second announcement message, wherein the second announcement message comprises a ranging response code corresponding to the ranging inquiry code.

Embodiment 20. The method according to embodiment 11, wherein the discovery message further comprises at least one of the following:

a ranging level ID, used for indicating target UE to be ranged; and ranging requirement information, used for indicating a ranging requirement for ranging.

Embodiment 21. A UE discovery message protection method, executed by a ranging key management function (RKMF) and comprising:

receiving an LTK request carrying an identifier of first UE; and sending, to the first UE, LTK and LTK ID determined based on the LTK request, wherein the LTK and the LTK ID are used for determining, in response to determining that the first UE located outside a network coverage monitors a first announcement message sent by second UE, a discovery key for encrypting a discovery message in the first announcement message based on the LTK ID in the first announcement message.

Embodiment 22. The method according to embodiment 21, comprising:

receiving a discovery request sent by the second UE, wherein the discovery request comprises an identifier of the second UE used for requesting on whether the second UE has the authorization to announce; and determining, based on the identifier of the second UE, that the second UE has the authorization to announce, and sending a discovery response to the second UE, wherein the discovery response is used for indicating that the second UE has the authorization to announce.

Embodiment 23. The method according to embodiment 22, comprising:

determining, based on the LTK, the discovery key or a middle key KD generating the discovery key; wherein the discovery response comprises one of the following:

the LTK ID, and the discovery key corresponding to the LTK ID;

the LTK ID, and a nonce; or the LTK ID, the KD generating the discovery key, and a nonce corresponding to the KD.

Embodiment 24. The method according to embodiment 23, wherein the discovery response comprises at least one of the following:

a ranging inquiry code, used for identifying the first announcement message;

a ranging response filter, used for matching the ranging response code; or a nonce, used for determining the discovery key together with the KD.

Embodiment 25. The method according to embodiment 22 or 23, wherein the discovery request comprises: a ranging level ID, used for indicating target UE to be ranged; and the method comprises:

sending verification information to a unified data management (UDM), wherein the verification information comprises the ranging level ID; and receiving a verification result returned by the UDM based on the verification information, wherein the verification result comprises: a target ranging level ID, used for indicating the target UE outside the network coverage indicated in the ranging level ID.

Embodiment 26. The method according to embodiment 25, wherein determining, based on the LTK, the discovery key or the middle key KD generating the discovery key comprises:

determining, on the basis that the identifier of the first UE is comprised in the target ranging level ID and that an available key of the first UE is invalid, the discovery key or the middle key KD generating the discovery key based on the LTK.

Embodiment 27. A UE discovery message protection apparatus, applied to first user equipment UE, and comprising:

a first receiving module, configured to monitor, in response to determining that the first UE is located outside a network coverage, a first announcement message, wherein the first announcement message comprises: a discovery message encrypted based on a discovery key and an LTK ID used for indicating a long-term key (LTK); and a first processing module, configured to determine, the discovery key based on the LTK corresponding to the LTK ID, wherein the LTK is received in response to determining that the first UE is within the network coverage.

Embodiment 28. A UE discovery message protection apparatus, applied to second user equipment UE, and comprising:

a sending module, configured to send, in response to determining that the second UE is within a network coverage, a first announcement message, wherein the first announcement message comprises: a discovery message encrypted based on a discovery key and an LTK ID used for indicating a long-term key (LTK); wherein the LTK ID is used for first UE outside the network coverage to determine the LTK corresponding to the LTK ID, and the LTK is used for the first UE to determine the discovery key.

Embodiment 29. A UE discovery message protection apparatus, applied to a ranging key management function (RKMF) and comprising:

a third receiving module, configured to receive an LTK request carrying an identifier of first UE; and a third sending module, configured to send, to the first UE, LTK and LTK ID determined based on the LTK request, wherein the LTK and the LTK ID are used for determining, in response to determining that the first UE located outside a network coverage monitors a first announcement message sent by second UE, a discovery key for encrypting a discovery message in the first announcement message based on the LTK ID in the first announcement message.

Embodiment 30. A communication device, comprising:

a processor; and a memory used for storing a processor executable instruction; wherein the processor is configured to: in response to determining that running the executable instruction, implement the UE discovery message protection method according to any one of embodiments 1 to 10, or embodiments 11 to 20, or embodiments 21 to 26.

Embodiment 31. A computer storage medium, storing a computer executable program, wherein the executable program, in response to determining that executed by a processor, implements the UE discovery message protection method according to any one of embodiments 1 to 10, or embodiments 11 to 20, or embodiments 21 to 26.

The invention claimed is:

1. A user equipment (UE) discovery message protection method, executed by first UE, and comprising:

monitoring, in response to determining that the first UE is located outside a network coverage, a first announcement message, wherein the first announcement message comprises: a discovery message protected based on discovery key(s) and a long-term key (LTK) identifier (ID) used for indicating an LTK;

determining the discovery key(s) based on the LTK corresponding to the LTK ID, wherein the LTK is received in response to determining that the first UE is within the network coverage;

further determining, based on configuration information received within the network coverage, whether the first UE has authorization to monitor, wherein the configuration information comprises: monitoring authorization of each UE within the network coverage.

2. The UE discovery message protection method according to claim 1, wherein the discovery message comprises at least one of the following: a ranging level ID, used for indicating target UE to be ranged; or ranging requirement information, used for indicating a ranging requirement for ranging.

3. The UE discovery message protection method according to claim 1, wherein the discovery key(s) at least comprises one of the following: a ranging encryption key (REK), used for encrypting the discovery message; or a ranging integrity key (RIK), used for protecting integrity of the first announcement message; the method comprising:

determining, based on the RIK, that the first announcement message is integral, and decrypting, the discovery message based on the REK.

4. The UE discovery message protection method according to claim 3, further comprising:

determining, based on at least one of a timestamp or a nonce obtained from the first announcement message, whether the first announcement message is under a replay attack;

determining, on the basis that the first announcement message is not under the replay attack, to send a second announcement message; or determining, on the basis that the first announcement message is under the replay attack, not to send the second announcement message; wherein the second announcement message comprises a ranging response code corresponding to a ranging inquiry code.

5. The UE discovery message protection method according to claim 1, wherein the first announcement message comprises: a ranging inquiry code, used for identifying the first announcement message; and the method comprises:

sending, on the basis that the ranging inquiry code matches with a pre-configured ranging inquiry filter, a second announcement message, wherein the second announcement message comprises a ranging response code corresponding to the ranging inquiry code.

6. The UE discovery message protection method according to claim 4, wherein sending the second announcement message comprises:

sending the second announcement message protected using at least one of the REK or the RIK.

7. A communication device, comprising:

a processor; and a memory used for storing a processor executable instruction; wherein the processor is configured to: in response to running the executable instruction, implement the UE discovery message protection method according to claim 1.

8. The UE discovery message protection method according to claim 1, wherein monitoring the first announcement message comprises:

monitoring the first announcement message at a direction communication (PC5) interface.

* * * * *